United States Patent [19]
Patkar et al.

[11] Patent Number: 6,086,669
[45] Date of Patent: Jul. 11, 2000

[54] DISPERSIBLE FREE FLOWING PARTICULATE SILICA COMPOSITION

[75] Inventors: Shailesh D. Patkar, Irwin; Harold E. Swift, Gibsonia; William B. Scott, Derry, all of Pa.

[73] Assignee: PPG Industries Ohio, Inc., Cleveland, Ohio

[21] Appl. No.: 09/058,393

[22] Filed: Apr. 9, 1998

[51] Int. Cl.$^7$ ................................................. C09C 1/28
[52] U.S. Cl. ............................................ 106/491; 106/505
[58] Field of Search ........................... 106/288 B, 308 Q, 106/491, 505; 260/42.14, 33.6 AO, 23.5 A; 524/262, 495, 274; 525/237; 526/347; 554/192

[56] References Cited

U.S. PATENT DOCUMENTS

| | | | |
|---|---|---|---|
| 3,737,334 | 6/1973 | Doran et al. | |
| 3,768,537 | 10/1973 | Hess et al. | 152/330 |
| 3,840,382 | 10/1974 | Burke | 106/288 B |
| 3,873,489 | 3/1975 | Thurn et al. | 260/33.6 |
| 3,929,715 | 12/1975 | Nowell et al. | |
| 3,994,742 | 11/1976 | Russull et al. | 106/288 |
| 4,000,317 | 12/1976 | Menda et al. | 424/357 |
| 4,143,027 | 3/1979 | Sollman et al. | 260/42.15 |
| 4,297,145 | 10/1981 | Wolff et al. | 106/308 |
| 4,436,847 | 3/1984 | Wagner | 523/203 |
| 4,463,108 | 7/1984 | Wagner et al. | 523/216 |
| 4,474,908 | 10/1984 | Wagner | 523/213 |
| 5,094,829 | 3/1992 | Krivak et al. | 423/339 |
| 5,143,962 | 9/1992 | Wolff et al. | 524/346 |
| 5,177,123 | 1/1993 | Takayama et al. | 523/210 |
| 5,256,196 | 10/1993 | Chjonowski et al. | 106/482 |
| 5,306,766 | 4/1994 | Omura et al. | 524/588 |
| 5,336,730 | 8/1994 | Sandstrom et al. | 525/332.6 |
| 5,412,018 | 5/1995 | Krivak et al. | 524/492 |
| 5,610,221 | 3/1997 | Waddell et al. | 524/492 |
| 5,703,151 | 12/1997 | Yamamoto et al. | 524/262 |

FOREIGN PATENT DOCUMENTS

| | | |
|---|---|---|
| 0 795 579 | 9/1997 | European Pat. Off. . |
| 1109840 | 4/1968 | United Kingdom . |
| WO 96/32949 | 10/1996 | WIPO . |
| WO 97/24396 | 7/1997 | WIPO . |

OTHER PUBLICATIONS

American Standard Test Method (ASTM) D 412—87 No Date.
ASTM D 623–93 No Date.
ASTM D 2084–95 No. Date.
ASTM D 2228–88 No Date.
International Organization for Standardization (ISO) 4662–1986 No Date.

*Primary Examiner*—Mark L. Bell
*Assistant Examiner*—Michael J. DiVerdi
*Attorney, Agent, or Firm*—Irwin M. Stein; James R. Franks

[57] ABSTRACT

Describes a free flowing particulate composition comprising, in combination, particulate amorphous precipitated silica, e.g., in the form of granules, hydrocarbon process oil, e.g., an aromatic process oil, and organic carboxylic acid having from 2 to 30 carbon atoms, e.g., stearic acid. The hydrocarbon process oil and organic carboxylic acid are sorbed on the silica and are present in amounts sufficient to measurably improve the dispersibility of the particulate amorphous precipitated silica into an elastomer as measured by percent white area. Optionally, an organosilane coupling agent may also be present in said composition. The free flowing particulate composition of the present invention is useful in reinforcing elastomers, e.g., rubbers used in vehicle tires and the soles of athletic foot wear.

24 Claims, 2 Drawing Sheets

DISPERSIBLE FREE FLOWING PARTICULATE SILICA COMPOSITION

DESCRIPTION OF THE INVENTION

The present invention relates to particulate compositions. More particularly, the present invention relates to free flowing particulate compositions comprising particulate amorphous precipitated silica and, in combination, hydrocarbon process oil and organic carboxylic acid. The particulate compositions of the present invention have measurably improved dispersibility when used for elastomer reinforcement.

The use of particulate amorphous precipitated silica as a reinforcing filler in elastomers, e.g., rubbers used in vehicle tire manufacture and the soles of athletic foot wear, is widely practiced. Particulate amorphous precipitated silica is typically used to impart improved physical properties, e.g., tensile strength, tear resistance and abrasion resistance, to the elastomers into which it is dispersed. As is known to those of ordinary skill in the art, an optimum improvement in elastomer physical properties, i.e., reinforcing properties, can be achieved when the particulate amorphous precipitated silica is thoroughly and homogeneously dispersed in the elastomer. A quantitative measure of the degree of silica dispersion within an elastomer matrix is percent white area. Lower values of percent white area are indicative of an improved degree of silica dispersion within the elastomer.

Particulate amorphous precipitated silica is typically dispersed in an elastomer using energy intensive mixing means, such as, internal mixers, a particularly common example of which is a Banbury mixer. In vehicle tire manufacture, the rubber, e.g., styrene-butadiene rubber, is first introduced into an internal mixer and then particulate amorphous precipitated silica is added while the mixer is running. While prolonged mixing can result in improved silica dispersion, there is a finite limit to the level of dispersion that is possible, this finite level being intrinsic to the particular silica used. Regardless of the specific type of reinforcing silica employed, it is desirable, with regard to manufacturing costs in particular, that this finite or maximum level of silica particle dispersion be achieved in a minimum amount of time.

It can be appreciated by those of ordinary skill in the art that the combination of optimum silica dispersion and minimum processing time are not readily compatible. It would be desirable to identify a free flowing composition comprising particulate amorphous precipitated silica that, when used as a reinforcing filler in an elastomer, provides an optimum level of dispersion in a minimum amount of processing time. Co-pending and commonly assigned U.S. patent application Ser. No. 08/994,255 discloses a method and apparatus for cracking amorphous precipitated silica particles. Also disclosed is a composition produced by mixing together rubber and the amorphous precipitated silica particles produced by the cracking method.

International patent publication number WO 96/32949 discloses substantially dry free-flowing particles of amorphous precipitated silica containing adsorbed organic liquid, e.g., plastisizers and/or softeners such as paraffinic oil and aromatic oil. The silica particles are described as having a size distribution such that at least 80 percent of the weight of said particles is retained on a 150 mesh screen and at least 90 percent by weight is retained on a 200 mesh screen.

International patent publication number WO 97/24396 discloses a particulate silica, which has been treated with from 2.5 percent to 40 percent by weight, based on silica weight, of polymer oil jelly. The polymer oil jelly is described as a substantially homogenous blend of oil extender, e.g., naphthenic process oil, and a thermoelastic polymer, e.g., a copolymer of ethylene, propylene and, optionally, a diene. When used as a reinforcing filler for elastomeric materials, the treated particles are described as being incorporated more quickly into the elastomer, resulting in shorter mixing times and, in consequence, less power.

U.S. Pat. Nos. 4,436,847 and 4,474,908 disclose a substantially dry, free-flowing rubber compounding additive comprising finely-divided siliceous pigment, organic silane coupling composition and rubber process oil. The siliceous pigment is described as having an ultimate particle size of from 5 to 100 nanometers.

It has now been surprisingly discovered that free flowing culate compositions according to the present invention have measurably improved dispersibility in an elastomer relative to either particulate amorphous precipitated silica alone or particulate amorphous precipitated silica containing hydrocarbon process oil. In accordance with the present invention, there is provided a free flowing particulate composition comprising in combination:

(a) particulate amorphous precipitated silica;
(b) hydrocarbon process oil; and
(c) organic carboxylic acid having from 2 to 30 carbon atoms, preferably from 3 to 25 carbon atoms, and more preferably from 10 to 20 carbon atoms, said hydrocarbon process oil and said organic carboxylic acid being sorbed on said silica and being present in amounts sufficient to measurably improve the dispersibility of said particulate amorphous precipitated silica into an elastomer, as measured by percent white area of the cured elastomer. Percent white area is measured in accordance with a method as further described herein.

There is further provided a method of improving the dispersibility of precipitated amorphous silica particles in an elastomer comprising dispersing into said elastomer the above described free flowing particulate composition of the present invention.

The features that characterize the present invention are pointed out with particularity in the claims which are annexed to and form a part of this disclosure. These and other features of the invention, its operating advantages and the specific objects obtained by its use will be more fully understood from the following detailed description and the accompanying drawings in which preferred embodiments of the invention are illustrated and described. In the accompanying drawings, like reference numerals represent the same structural parts, and the same process streams.

Other than in the operating examples, or where otherwise indicated, all numbers expressing quantities of ingredients or reaction conditions used in the specification and claims are to be understood as modified in all instances by the term "about". As used herein, values of mesh sieve screen, e.g., 200 mesh sieve screen, are made with reference to screens of the U.S. Standard Sieve Series.

DETAILED DESCRIPTION OF THE INVENTION

Figure 1:
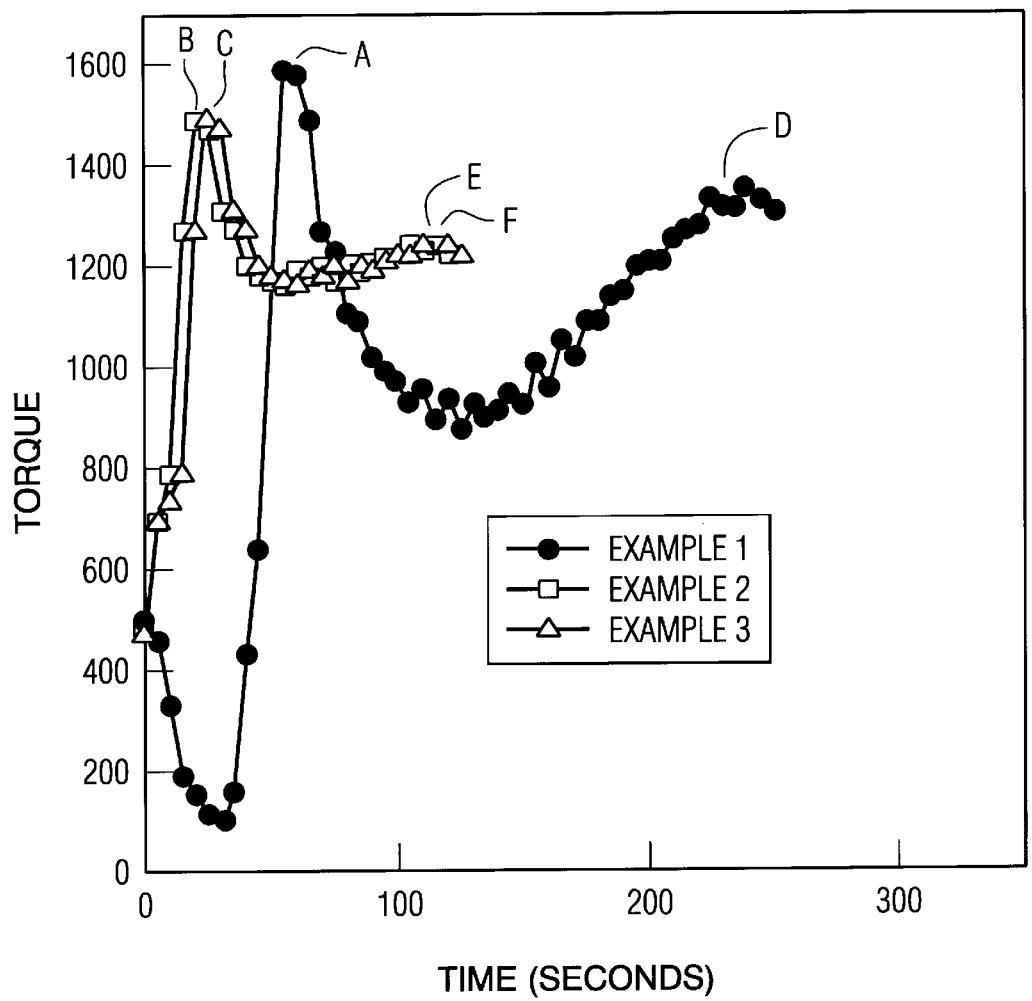
FIG. 1 is a graph showing plots of torque versus time corresponding to the separate dispersing of comparative particulate compositions and a particulate composition according to the present invention into an elastomer.

The hydrocarbon process oil and organic carboxylic acid of the free flowing particulate composition of the present invention may be added to, e.g., sorbed onto, the particulate amorphous precipitated silica either together, e.g., from a homogenous mixture, or separately. If added to the silica separately, they may be added in any order. The hydrocarbon process oil and organic carboxylic acid are generally added together to the silica. The hydrocarbon process oil and organic carboxylic acid may be added to the silica by any convenient means, e.g., spray application, curtain application, immersion and pouring.

As used herein, the term "free flowing" is intended to mean a particulate composition having the handling characteristics of a substantially dry particulate composition. Particulate compositions according to the present invention will preferably have a minimum of clumping or aggregation between individual particles and will accordingly be free flowing.

The hydrocarbon process oil and organic carboxylic acid are present in amounts sufficient to measurably improve the dispersibility of the particulate amorphous precipitated silica into an elastomer as measured by percent white area of the cured elastomer. When used to prepare rubbers having the same final compositions, e.g., the same silica, hydrocarbon process oil and organic carboxylic acid levels measured in parts per hundred parts rubber (phr), the particulate composition of the present invention has been found to have measurably improved dispersibility when compared to: (a) the same particulate amorphous precipitated silica having neither hydrocarbon process oil nor organic carboxylic acid sorbed thereon; and (b) the same particulate amorphous precipitated silica having only hydrocarbon process oil sorbed thereon.

Percent white areas of cured elastomers, e.g., cured vehicle tire rubber compositions, as referenced herein were determined according to the method protocols enumerated in the Examples below. Cured elastomers reinforced with free flowing particulate compositions according to the present invention will typically have percent white areas of, for example, less than 2 percent. Often the percent white areas are less than 1 percent. Lower values of percent white area are indicative of an improved level of silica dispersion within the elastomer. A higher level of silica dispersion can result in a subsequent improvement in elastomer physical properties. In the case of rubbers used for vehicle tire manufacture, improved tread wear, e.g., as measured by running the tire for hundreds of miles on a track, is known to be related to an improved level of silica dispersion within the tread rubber.

As used herein, the term "hydrocarbon process oil" is intended to mean and include oils used in the processing of elastomer compositions, e.g., rubber compositions used for vehicle tires and the soles of foot wear. Classes of hydrocarbon process oils useful in the present invention include, but are not limited to: the aromatic, naphthenic and paraffinic hydrocarbon fractions defined in America Society of Testing Materials (ASTM) designation D 2226; and oils obtained from natural, e.g., plant, sources, such as, rapseed oil. In a preferred embodiment of the present invention, the hydrocarbon process oil is an aromatic process oil.

The hydrocarbon process oil is typically present in the composition of the present invention in an amount of at least 10 percent by weight, preferably at least 20 percent by weight, and more preferably at least 30 percent by weight, based on the weight of the particulate amorphous precipitated silica. The hydrocarbon process oil is also typically present in the composition in an amount of less than 70 percent by weight, preferably less than 60 percent by weight, and more preferably less than 55 percent by weight, based on the weight of the particulate amorphous precipitated silica. The amount of hydrocarbon process oil present in the free flowing particulate composition of the present invention may range between any combination of these values inclusive of the recited values. In a particularly preferred embodiment of the present invention, the hydrocarbon process oil is present in the particulate composition in an amount of from 40 percent to 50 percent by weight, e.g., 46 percent by weight, based on the weight of the particulate amorphous precipitated silica.

Classes of organic carboxylic acids that may comprise the free flowing particulate composition of the present invention include, but are not limited to: straight or branch chain carboxylic acids having no ethylenic unsaturation, e.g., acetic acid, propionic acid, 2-methyl propionic acid, butanoic acid, pentanoic acid, pentanedioc acid, hexanoic acid, heptanoic acid, octanoic acid, nonanoic acid, decanoic acid, undecanoic acid, dodecanoic acid, lauric acid, myristic acid, palmitic acid, stearic acid, icosanoic acid, pentacosanoic acid and triacontanoic acid; straight or branched chain carboxylic acids having ethylenic unsaturation, e.g., 9,10-octadecanoic acid, 9,12-octadecadienoic acid and 9,12,15-octadecatrienoic acid; cyclic aliphatic carboxylic acids, e.g., cyclopentane carboxylic acid, cyclohexane carboxylic acid, 1,4-cyclohexane dicarboxylic acid and 2-bicyclo [2,2,1]heptanoic acid; aromatic carboxylic acids, e.g., benzoic acid, terephthalic acid and naphthalene dicarboxylic acid; and substituted organic carboxylic acids, e.g., lactic acid, leucic acid, 12-hydroxystearic acid and 3-bromo-henzoic acid.

Preferred organic carboxylic acids include, propionic acid, lauric acid, oleic acid, stearic acid and mixtures thereof. In a particularly preferred embodiment of the present invention, the organic carboxylic acid is stearic acid.

The organic carboxylic acid is typically present in the composition of the present invention in an amount of at least 0.5 percent by weight, preferably at least 0.75 percent by weight, and more preferably at least 1 percent by weight, based on the weight of the particulate amorphous precipitated silica. The organic carboxylic acid is also typically present in the composition in an amount of less than 10 percent by weight, preferably less than 5 percent by weight, and more preferably less than 3 percent by weight, based on the weight of the particulate amorphous precipitated silica. The amount of organic carboxylic acid present in the free flowing particulate composition of the present invention may range between any combination of these values inclusive of the recited values.

The free flowing particulate composition of the present invention, comprises particulate amorphous precipitated silica. Particulate amorphous precipitated silica is usually produced commercially from an aqueous solution of alkali metal silicate, e.g., sodium silicate. Typically an acid, e.g., sulfuric acid, hydrochloric acid or carbon dioxide, is added to the alkali metal silicate to precipitate the silica particles. Alternatively, a polyvalent metal cation, e.g., calcium ions, can be used to precipitate the silica from solution.

Following precipitation, the amorphous precipitated silica is usually washed and then dried. Examples of methods by which amorphous precipitated silica may be dried include, for example, tray drying in an oven, drying in a fluidized bed, and drying in a rotary dryer. Particulate amorphous precipitated silica useful in the present invention is preferably dried using a spray dryer in which a feed of an aqueous dispersion of the silica is sprayed into a column of moving hot air. Spray dryers and their operation are well known to those of ordinary skill in the art. Typically, the spray dryer is operated at an outlet temperature of at least 100° C., although lower outlet temperatures may be employed when, for example, lower evaporation rates can be tolerated. More often, the spray dryer is operated at an outlet temperature ranging from 100° C. to 170° C., and preferably from 100° C. to 130° C., the ranges being inclusive of the recited values.

After drying, e.g., spray drying, the amorphous precipitated silica has the characteristics of a dry solid when handled. While the dried amorphous precipitated silica may be described as substantially dry, it is ordinarily not absolutely anhydrous, in that it typically contains: bound water, present in an amount of from, for example, 2 percent to 5 percent by weight, based on silica weight; and adsorbed (or free) water, present in an amount of from, for example, 1 percent to 7 percent by weight, based on silica weight. Adsorbed water is that water which is removed from the silica by heating at a temperature of 105° for a period of 24 hours at atmospheric pressure in a laboratory oven. The amount of adsorbed water present on the silica is often partly dependent upon the relative humidity of the atmosphere to which the silica is exposed. Bound water is that water which is removed by additionally heating the silica at temperatures ranging from, for example, 600° C. to 1200° C., i.e., calcination temperatures. The water content (inclusive of both adsorbed and bound water) of particulate amorphous precipitated silica useful in the present invention is usually less than 12 percent by weight, preferably less than 9 percent by weight, and more preferably less than 7 percent by weight, all percent weights being based on silica weight.

Particulate amorphous precipitated silica having particle sizes smaller than those obtained from, for example, spray drying, are also useful in the present invention. Size reduction of particulate amorphous precipitated silica can be accomplished by several methods, including for example, fluid energy mills, roller mills and hammer mills.

The present invention is applicable to particulate amorphous precipitated silica having a variety of physical forms, e.g., powders, granules, beads and spherules. In a preferred embodiment of the present invention, the particulate amorphous precipitated silica is in the form of granules. In a particularly preferred embodiment of the present invention, the particulate amorphous precipitated silica is in the form of cracked amorphous precipitated silica granules.

Figure 2:
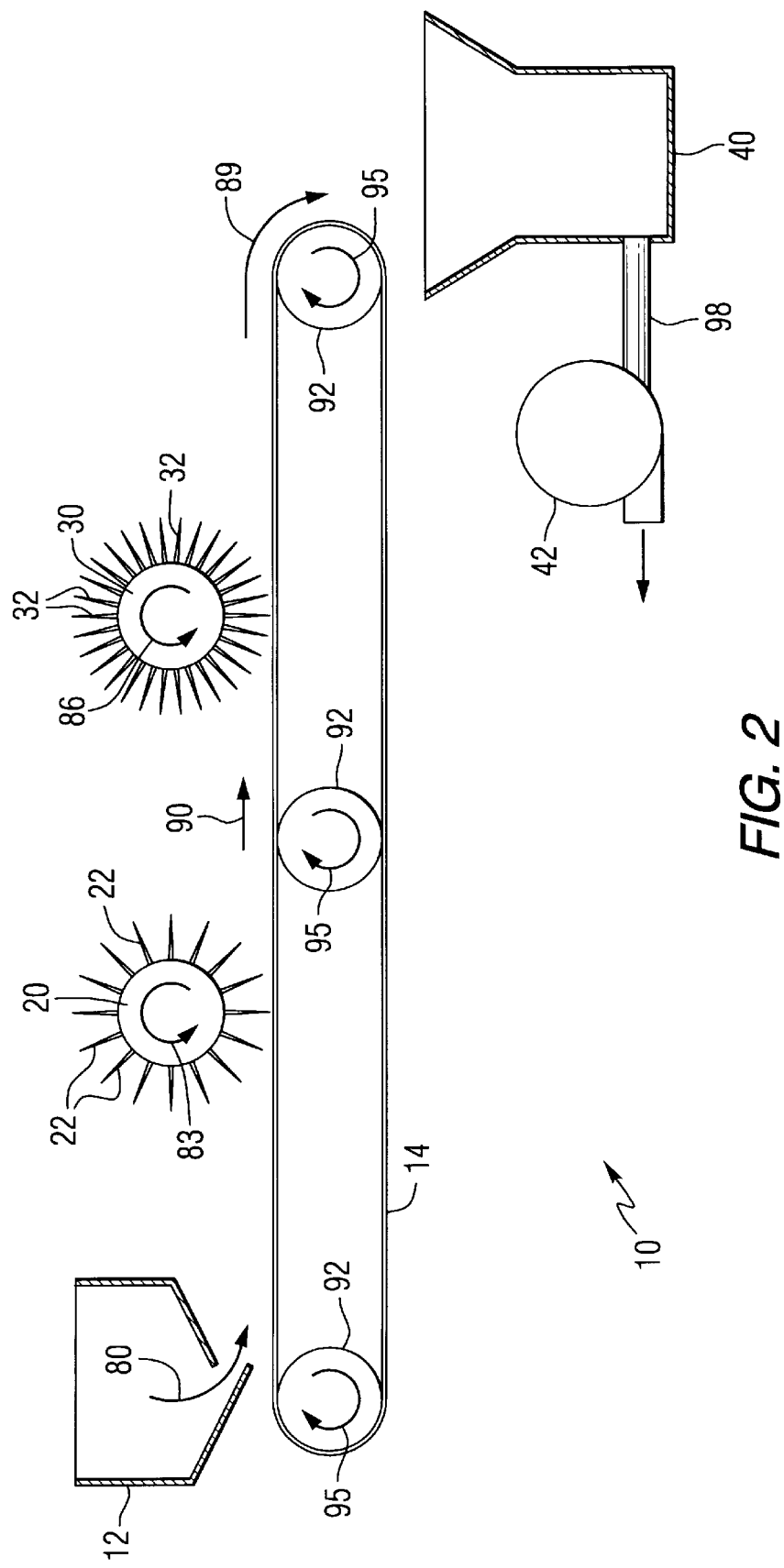
FIG. 2 is a schematic representation of an apparatus used to prepare cracked particulate amorphous precipitated silica granules useful in the present invention.

Cracked, i.e., size reduced, amorphous precipitated silica granules useful in the present invention may be produced according to the following procedure using an apparatus similar to that represented schematically in FIG. 2. A feedstock of a granulated amorphous precipitated silica, e.g., Hi-Sil® granulated silica available commercially from PPG Industries Inc., is added to hopper 12 of apparatus 10. The granulated silica feedstock is transferred uniformly from hopper 12 to conveyor belt 14, as indicated by arrow 80, at a steady rate. Conveyor belt 14 is driven by driving rollers 92, which are rotated in the direction indicated by arcuate arrows 95.

The silica feedstock is transported along conveyor belt 14 to a first rotatable roll 20 positioned above conveyor belt 14. First rotatable roll 20, having closely spaced sharply pointed spikes 22 extending from its surface, is rotated in the direction indicated by arcuate arrow 83. Spikes 22 engage intimately with the granulated silica feedstock to produce intermediate cracked amorphous precipitated silica granules on the immediate downstream side of roll 20.

The intermediate cracked amorphous precipitated silica granules are then further transported downstream by conveyor belt 14, as indicated by arrow 90, to second rotatable roll 30 located above conveyor belt 14. Second rotatable roll 30, having closely spaced sharply pointed spikes 32 extending from its surface, is rotated in the direction indicated by arcuate arrow 86. Spikes 32 engage intimately with the intermediate cracked granules carried on conveyor belt 14 and produce product cracked amorphous precipitated silica granules on the immediate downstream side of roll 30. The product cracked amorphous precipitated silica granules have generally smaller sizes than those of the intermediate cracked granules.

The product cracked amorphous precipitated silica granules are further transported downstream by conveyor belt 14 and deposited into receiving hopper 40, as depicted by arrow 89. Receiving hopper 40 includes a vacuum system 42 for removing dust from the product cracked amorphous precipitated silica granules through conduit 98.

The of outwardly extending sharply pointed spikes 32 of roll 30 are arranged in a plurality of circumferential rows (not shown). Within a circumferential row, the distance between adjacent spikes 32 is approximately 3.18 mm, based on the intersection of spike centerlines with the outer surface of roll 30. Additionally, the distance between adjacent rows of spikes is approximately 3.18 mm, based on the intersection of spike centerlines with the outer surface of roll 30. Sharply pointed spikes 32 themselves extend the same distance from the outer surface of roll 30.

Roll 20 is substantially the same as roll 30 except for the spacing of outwardly extending sharply pointed spikes 22. Within a circumferential row (not shown), the distance between adjacent spikes 22 is approximately 6.35 mm, based on the intersection of spike centerlines with the outer surface of roll 20. Additionally, the distance between adjacent rows of spikes is approximately 6.35 mm, based on the intersection of spike centerlines with the outer surface of roll 20. Sharply pointed spikes 22 extend the same distance from the outer surface of roll 20 and are evenly spaced across the surface of roll 20. More specific details concerning rolls 20 and 30, are found in co-pending and commonly assigned U.S. patent application Ser. No. 08/994,255, the disclosure of which is incorporated herein in its entirety.

In apparatus 10 illustrated in FIG. 2, a common motor can be utilized for driving conveyor belt 14, roll 20, and roll 30. Appropriate gearing can be used to select the desired rotational speeds for the individual rolls. Sharply pointed spikes 22 extend the same radial distance from the surface of roll 20 and sharply pointed spikes 32 extend the same radial distance from the surface of roll 30. Roll 20 and roll 30 are positioned so that sharply pointed spikes 22 and sharply pointed spikes 32 almost engage the upper surface of conveyor belt 14 to assure that sharply pointed spikes 22 and sharply pointed spikes 32 will engage the particles to be reduced in size. The speeds of roll 20 and roll 30 should provide linear speeds of the ends of sharply pointed spikes 22 and sharply pointed spikes 32 that are at least equal to and even greater than the speed of conveyor belt 14 to ensure that sharply pointed spikes 22 and sharply pointed spikes 32, respectively, will properly engage and crack the particulate precipitated amorphous silica.

Cracked precipitated amorphous silica granules prepared as described with reference to FIG. 2, will have a reduced level of dust. As used herein, by "dust" is meant particles of precipitated amorphous silica that will pass through a 200 mesh sieve screen, i.e., a sieve screen having openings of 0.075 mm. Cracked granules prepared as described herein typically contain less than 1 percent by weight of dust, and more often less than 0.6 percent by weight of dust.

While not intending to be bound by any theory, it is believed that cracking is enhanced and dust is reduced by minimizing the surface area of individual spikes that come into contact with the particulate amorphous precipitated silica granules being cracked. Generally a larger contact surface area will result in a higher level of dust produced during the cracking process. Consequently, the use of sharply pointed spikes is believed to greatly assist in the reduction of dust in the cracking process described with reference to FIG. 2.

The particulate amorphous precipitated silica of the composition of the present invention may be of any suitable particle size or particle size distribution. If the particulate silica is in the form of a powder, the average particle size may range from, for example, 60 to 600 microns. In a preferred embodiment of the invention, at least 50 percent by weight of the particulate amorphous precipitated silica is in a size range of from 0.15 mm to 2.8 mm. Preferably at least 50 percent by weight of the particulate silica is in a size range of from 0.3 mm to 2.8 mm. It is especially preferred that at least 65 percent by weight of the particulate silica is in a size range of from 0.85 mm to 2.8 mm. Typically, less than 30 percent by weight of the particulate silica is greater than 2.8 mm. The particulate amorphous precipitated silica is preferably in the form of granules, e.g., cracked granules prepared as described previously herein.

Particulate amorphous precipitated silica useful in the present invention, and particularly when in the form of granules, will typically have a friability of less than 2 percent and preferably less than 1.7 percent. As used herein by "friability" is meant the tendency of a material to break up during its preparation and use, e.g., packaging, transportation, conveying and weighing. For a description of the method used to calculate friability, see Example A herein.

The free flowing particulate composition of the present invention may optionally include one or more organosilane coupling agents. The organosilane coupling agent(s) is preferably present in at least a coupling amount. By "coupling amount" is meant an amount sufficient to provide adequate coupling between the particulate amorphous precipitated silica and the elastomer into which it is dispersed. The sufficiency of coupling between the particulate silica and the elastomer can be determined from the physical properties of the cured elastomer, e.g., 300 percent elongational modulus data.

O rganosilane coupling agents useful in the present invention include any of those commonly used when reinforcing an elastomer with particulate amorphous precipitated silica. Classes of organosilane coupling agents that may be present in the free flowing particulate composition of the present invention include, but are not limited to: organo silane coupling agents containing an active olefinic linkage having an internal double bond, e.g., as disclosed in U.S. Pat. No. 3,737,334; bis(alkoxysilylalkyl)polysulfides, e.g., as disclosed in U.S. Pat. No. 3,873,489; haloalkylsilafies, e.g., as disclosed in U.S. Pat. No. 4,297,145; organosilane coupling agents containing vinyl functionality in the organofunctional groups, e.g., vinyltris(beta-methoxyethoxy)silane; mercaptosilanes, e.g., (beta-mercaptoethyl)trimethoxysilane and those disclosed in U.S. Pat. Nos. 4,436,847 and 4,474,908; alkoxysilanes, e.g., as disclosed in U.S. Pat. Nos. 4,436,847 and 4,474,908; and organosilane coupling agents containing polysulfide linkages, e.g., bis(3-triethoxy silyl propyl)tetrasulfide silane. The relevant disclosure of the cited U.S. Patents is incorporated herein by reference. Preferred organosilane coupling agents include (betamercaptoethyl)trimethoxysilane, bis(3-triethoxy silyl propyl)tetrasulfide silane and mixtures thereof.

If included in the free flowing particulate composition of the present invention, the organosilane coupling agent(s) is typically present in an amount of at least 3 percent by weight, preferably at least 5 percent by weight, and more preferably at least 6 percent by weight, based on the weight of the particulate amorphous precipitated silica. The organosilane coupling agent(s) may also be included in the free flowing particulate composition of the present invention in an amount of less than 15 percent by weight, preferably less than 12 percent by weight, and more preferably less than 10 percent by weight, based on the weight of the particulate amorphous precipitated silica. The amount of organosilane coupling agent included in the free flowing particulate composition of the present invention may range between any of these values inclusive of the recited values.

The free flowing particulate composition of the present invention may contain other compounds, e.g., liquid additives used in elastomer processing. Such other compounds include, for example: antiozonants, e.g., N,N'-bis(1,4-dimethylpenyl)-1,4-phenylenediamine; tackifiers, e.g., pine tar; activators, e.g., diethylene glycol; accelerators, e.g., triallyl cyanurate and the reaction product of butyraldehyde and aniline; sealing agents such as liquid maleinized 1,2-polybutadiene resin, isoprene, liquid polyisoprene and hexakis(methoxymethyl)melamine; polyoctenamer processing aids, e.g., Vestenamer® grades 8012 and 6213 processing aids available commercially from Hials; and fatty acid salts, e.g., zinc stearate. If present in the free flowing particulate composition of the present invention, such other compounds are present in amounts typically less than 20 percent by weight, and more typically less than 10 percent by weight, e.g., less than 5 percent by weight, based on the weight of the particulate amorphous precipitated silica.

The present invention also provides a method of improving the dispersibility of particulate precipitated amorphous silica into an elastomer. The method comprises adding to and mixing the free flowing particulate composition of the present invention with the elastomer. The improved dispersibility is determined by measurement of percent white area, as discussed in the Examples herein. Mechanical means of dispersing particulate amorphous precipitated silica into an elastomer are known to those skilled in the art and include, for example, internal mixers, single screw extruders, reciprocating single screw extruders, and co- or counter-rotating twin screw extruders. In the processing of rubbers used in vehicle tire manufacture, internal mixers are often used. Typically, elastomers will be processed in an internal mixer, e.g., a Banbury internal mixer, at a temperature of from 35° C. to 175° C., in one to several passes, e.g., two to three passes through the mixer. The particulate composition of the present invention provides the further benefit of reducing the number of passes through the mixer required to disperse the silica in the elastomer, e.g., from 3 to 2 passes.

Elastomers into which the free flowing particulate compositions of the present invention may be dispersed are well known to the skilled artisan in elastomer chemistry and processing, and include sulfur-curable elastomers. Particularly contemplated are those elastomers which are typically used for mechanical rubber goods. Examples of elastomers into which the free flowing particulate compositions of the present invention may be dispersed include, but are not limited to, natural rubber, styrenebutadiene rubber, polybutadiene, ethylene-propylene rubber, polychloroprene, polyisoprene, butadiene-acrylonitrile copolymers, vinyl acetate-ethylene copolymers and mixtures thereof.

As discussed previously herein, when dispersing the free flowing particulate compositions of the present invention into an elastomer, in addition to obtaining an optimum degree of dispersion, it is also desirable, though not necessary, that this be achieved in a minimum amount of processing time. The torque versus time processing data summarized in FIG. 1 indicates that a free flowing particulate composition according to the present invention, represented by Example 3, has incorporation times and dispersive times substantially equivalent to or less than those of comparative particulate compositions, represented by Examples 1 and 2.

With reference to FIG. 1, the torque versus time data were generated during the first pass of the particulate compositions and elastomer through an internal mixer, as described in further detail in the Examples. During the first pass, the torque exerted upon the internal mixer as a function of time was measured and plotted. Typically such plots of torque versus time have two principal peaks. The first peak is indicative of the time at which all of the added silica has been substantially incorporated into the rubber. The time corresponding to the first peak is commonly referred to as the incorporation time. As shown in FIG. 1, first peak times A, B and C correspond to the first peaks of the torque versus time curves of Examples 1, 2 and 3 respectively. The second peak is indicative of the point when the silica particles have been evenly or homogeneously dispersed throughout the rubber. The time corresponding to the second peak is often referred to as the dispersive time. While not intending to be bound by any theory, it is believed that mixing of the rubber and particulate silica together does not begin to appreciably affect the degree of dispersion until after the second peak time. As shown in FIG. 1, second peak times D, E and F correspond to the second peaks of the torque versus time curves of Examples 1, 2 and 3 respectively.

The present invention is more particularly described in the following examples, which are intended to be illustrative only, since numerous modifications and variations therein will be apparent to those skilled in the art. Unless otherwise specified, all parts and percentages are by weight.

Examples A through C describe the preparation of particulate amorphous precipitated silicas used in the rubber compositions of Examples 1 through 3. Each of the rubber compositions of Examples 1 through 3 were formulated to provide a rubber having the composition as represented in Table 1. Physical properties of samples corresponding to the rubber compositions of Examples 1–3 are summarized in Table 2.

In Table 2, values of percent white area were determined riding to the following microtomy, section preparation, equipment and software selection, field selection and image analysis method protocols. Lower values of percent white area are indicative of improved silica dispersion within the elastomer matrix.

Microtomy Protocol

Use an RMC MT-6000-XL microtome equipped with a CR2000 cryogenic accessory (RMC Biotechnology Tool Inc., Tucson, Ariz.) and a Micro Star LH grade, black, standard boat style diamond knife (Micro Star Technologies, Huntsville, Tex.), or equivalent, for microtoming. Mount a diamond cutting edge 6 to 10 mm long cut at an included angle of 45 degrees in the microtome cryo knife holder and set the microtome clearance angle to 4 degrees as specified on the bottom of the knife as received.

Set the specimen and diamond knife temperatures identically in the range of from −70° C. to −40° C.

Cut a rough sample about 15 mm×about 15 mm from the cured rubber sheet. Place this rough sample in the microtome stainless steel flat specimen holder and securely tighten the sample down with an Allen wrench supplied with the microtome. Using the specimen trimming block supplied with the microtome, the flat holder, and a razor blade, trim the specimen so that about 4 mm of the specimen protrudes from the face of the holder and trim the corners from the specimen so that the block face for microtoming is about 8 mm long.

Position the holder in the cryo unit arm of the advance mechanism of the microtome so that the length of the block face is vertical. Cool to the specimen temperature set earlier. Manually plane the block face using a dulled edge region of the diamond knife to create a smooth flat surface on the block face. Move the knife edge to use a clean virgin region of the diamond knife edge and plane a few thin sections from the block face. Set the cutting stroke to 5 mm per minute and manually advance the block face to cut sections approximately 2 micrometers ($\mu$m) in thickness on a clean virgin area of the diamond knife edge by moving over to a new area of the same knife.

Secure each section, as it first breaks over the edge of the diamond knife with a pair of biological-grade number 5 fine tipped normally open or normally self-closing straight tweezers (A. Dumont & Fils, Switzerland; Structure Probe Inc., West Chester, Pennsylvania), or equivalent. Hold each section at its corner as it starts to come off and gently pull the section away from the knife edge without breaking, cracking or stretching it throughout the cutting stroke to minimize the possibility of the section rolling up or compressing excessively against the edge of the knife. Cut the sections dry; do not use dimethylsulfoxide or xylenes to aid in cutting. At the end of the cutting stroke, draw the intact section gently with the tweezers onto a cryo-cooled Fisherbrand® Superfast® Plus glass microscope slide, size 25 mm×75 mm×1 mm, (Fisher Scientific Co., Pittsburgh, Pa.), or equivalent. The slide, which has previously been cleaned with optical lens tissue or equivalent, rests on the top of a custom cut U-shaped silicone rubber spacer that surrounds the knife boat on two sides and its back surface. Place from eight to ten thin sections from a sample onto each glass slide and position them for convenient preparation during optical mounting. Remove the slide from the cryo chamber, place it in a microscope slide box to avoid excessive moisture contamination, and allow it to warm to room temperature.

Section Preparation Protocol

Coat the thin sections residing on the microscope slide with Cargille Series A $n_D$=1.550±0.0002 immersion oil (R.P. Cargille Laboratories, Inc., Cedar Grove, N.J.), or equivalent. Tease the thin sections carefully using tweezers and/or pointed probes on the stage of a Nikon SMZ-UZoom 1:10 Stereo Microscope, or equivalent, equipped with A Nikon SMZ-U UW 10xA/24 binocular eyepiece assembly (Nikon Corporation, Tokyo, Japan), or equivalent, at low magnification to remove folds, wrinkles and pleats, and to straighten the sections. Care must be taken not to tear the delicate thin sections during this manipulation process. Align the straightened thin sections parallel to one another in groups of one to five (preferably four) for optimum spatial placement under an 18 mm diameter circular cover glass. Clean an 18 mm diameter, 0.13 mm to 0.17 mm thick circular microscope cover glass, (Fisher Scientific Co., Pittsburgh, Pa.), or equivalent, with optical lens tissue or equivalent, and place it on a group of aligned sections. Two or three groups of sections can be accommodated on a microscope slide. Fold a Scotties® two-ply 23.3 cm×18.2 cm (9.2 inch×7.2 inch) facial tissue (Scott Paper Company, Philadelphia, Pa.), or equivalent, into the approximate size of a slide for use as a blotter. Place the blotter over the cover glass protected sections on the microscope slide and apply a flat plate or microscope slide box over the blotter. Manually apply a firm, gentle, uniformly steady, downward force to the plate or slide box and maintain the force for approximately 15 seconds. Remove the flat plate or slide box and the blotter. Repeat the blotting procedure using a fresh surface of Scotties® tissue or equivalent, but use less force.

Equipment and Software Selection Protocol

Use the following equipment or equivalent for field selection: a Nikon Microphot FXA research optical microscope equipped with a phase contrast objective module fitted with a plan 20×/0.05 Ph2 phase objective, a Ph2 phase condenser lens (Nikon Corporation, Tokyo, Japan), a system magnification of 1.25×, and an intermediate lens magnification of 1.25×; a Sony Trinitron PVM 1343MD Color Video Monitor (Sony Corporation, Tokyo, Japan), and a Sony CCD three-chip DXC-760MD Camera (Sony Corporation, Tokyo, Japan) ; a MacIntosh® Ilfx Computer with a Color SuperMac® 43 cm (17 inch) monitor (Apple Corporation, Cupertino, Calif.) and a Data Translations frame store card (Data Translations, Raleigh, N.C.). Use the following software or equivalent for capturing images and image analysis: ColorKit™ software (Data Translations, Raleigh, N.C.), NIH Image software (National Institute of Health, Washington, DC), and Microsoft® Excel® software (Microsoft Corporation, Redmond, Wash.).

Field Selection Protocol

Scan the microtomed sections having thicknesses in the range of from about 2 to about 3 µm that have been prepared for phase contrast optical microscopic examination to eliminate from further consideration sections which contain major anomalies such as wrinkles, folds, waves, tears, and/or dirt particle populations. Choose fields using blind longitudinal traverses and blind cross traverses of the microscope stage on each section. Use only fields exhibiting low relief (accuracy of white area measurement is enhanced by accepting only substantially flat fields; fields exhibiting variable high relief result in blurred, out of focus images due to the low depth of field which is characteristic of the optical microscope). From at least two sections, capture a total of ten field images as PICT formatted files using the Colorkit® software. Save the PICT files to optical disk for computer assisted white area measurement.

Image Analysis

Videomicrograph files saved as PICT files may be opened directly using the Image software. Upon opening a PICT file, an image appears as a raster of 640 pixels×480 pixels on the monitor at a scale of 2.00±0.06 linear pixels per micrometer of object distance. The actual value of the scale can be ascertained by projecting horizontally on the monitor an image of a stage micrometer having 10 µm tim per division, and marking a distance of 250 µm or greater of the displayed image. Enter the actual distance marked into the software and allow the computer to calibrate the scale, also known as a calibration factor, in units of linear pixels/µm.

Analyze each selected field image individually. Smooth the image to remove background noise. Threshold and edit the image manually to identify the white areas to be counted and to remove artifacts. Convert the edited image to a binary image and save the binary image as a file.

From the Options menu, choose the area parameter and set the minimum number of pixels to be counted at 4.

Analyze each binary image to produce a list of numbers, where each number is the area of an individual white area, and save the list. Use the Microsoft® Excel® software to sum the numbers of the list to produce a total white area for the field.

Find the percent white area for a field by dividing the total white area by the total area for one field and multiplying the quotient by one hundred. Find the standard white area by taking the average of the white areas of the ten fields captured.

EXAMPLE A

Granulated precipitated amorphous silica, available commercially from PPG Industries Inc. under the tradename Hi-Sil® EZ, was cracked according to the method previously described herein with reference to FIG. 2. The cracked amorphous precipitated silica granules obtained from apparatus 10 of FIG. 2 had the following physical properties.

| | |
|---|---|
| Single Point BET [a] Surface Area ($m^2/g$) | 169 |
| Five Point BET Surface Area ($m^2/g$) | 154 |
| Friability (percent) [b] | 0.9 |
| Screen Analysis [c] (Percent by weight retained) | |
| 7 mesh (2.8 mm opening) | 17.3 |
| 20 mesh (0.850 mm opening) | 73.1 |
| 50 mesh (0.300 mm opening) | 7.3 |
| 100 mesh (0.150 mm opening) | 1.5 |
| 200 mesh (0.075 mm opening) | 0.6 |
| Pan | 0.3 |

[a] Brunauer, Emmett, Teller (BET) method using nitrogen gas as the absorbate.
[b] Friability was determined by adding 45 to 65 grams of an amorphous precipitated silica sample, obtained from one of four splits using a universal splitter, to the top of a stack of United States Sieve Series screens. The sieves were stacked top to bottom, 50 mesh, 100 mesh and 200 mesh with a pan on the bottom. The sieve stack was sealed with a lid, shaken for five minutes, and a first dust sample was collected and removed from the sample, i.e., material collected in thepan. A corrected sample weight was determined by subtracting the weight of the first dust sample from the original sample weight. The sieve stack was shaken for an additional 30 minutes and a second dust sample was collected. Percent friability was calculated using the following formula: 100 × (weight of second dust sample/corrected sample weight).
[c] The screen analysis involved stacking the sieves from top to bottom in the order shown, the pan being on the bottom. To the top 7 mesh sieve was added 50 to 55 grams of the silica sample. The sieve stack was sealed with a lid and vibrated on a sieve shaker for 5 minutes. The weight of silica retained on each screen and in the bottom pan was measured and the percent by weight retentions were calculated.

EXAMPLE B

A portion of the cracked amorphous precipitated silica granules of Example A was treated with Sundex® 8125 aromatic hydrocarbon process oil, available commercially form Sun Company, Inc., Refining and Marketing Division, according to the following method. A 30 g sample of the process oil was heated to 80° C. and added to a 100 ml beaker containing 65 grams of the silica of Example A. The oil addition was made over a period of 60 seconds while the contents of the beaker were gently and continuously shaken by hand. After the completion of the oil addition, the beaker was hand shaken for an additional 5 minutes, and then transferred to a suitable container. The interior of the beaker was inspected visually to ensure that no oil was remaining therein. The resulting oil treated cracked silica granules were free-flowing and contained 46.2% by weight aromatic hydrocarbon process oil, based on silica weight.

EXAMPLE C

A portion of the cracked amorphous precipitated silica granules of Example A was treated with Sundex® 8125 aromatic hydrocarbon process oil, and rubber grade stearic acid, obtained commercially from C. P. Hall, according to the following method. A 30 gram sample of the oil containing 1 gram of stearic acid was heated to 80° C. and added to a 100 ml beaker containing 65 grams of the silica in a manner similar at described in Example B. The resulting treated cracked silica granules were free-flowing and contained 46.2% by weight aromatic hydrocarbon process oil, based on silica weight, and 1.5% by weight stearic acid, based on silica weight.

EXAMPLE 1

A rubber composition was prepared using the amorphous precipitated silica of Example A and the following enumerated ingredients.

| Ingredients | Parts by Weight | Time Added To Mixer (minutes) |
|---|---|---|
| Pass 1 | | |
| SBR Rubber [d] | 70.0 | 0 |
| BR Rubber [e] | 30.0 | 0 |
| Silica of Example A | 32.5 | 0.5 |
| Silica of Example A | 32.5 | 1.5 |
| Carbon black [f] | 13.0 | 2.5 |
| Zinc oxide [g] | 2.5 | 3.5 |
| Antiozonant [h] | 2.0 | 3.5 |
| Processing oil [i] | 30.0 | 3.5 |
| Stearic acid [j] | 1.0 | 3.5 |
| Pass 2 | | |
| Product of Pass 1 | 213.5 | 0 |
| Antiozonant [k] | 2.0 | 2 |
| Petroleum Wax [l] | 1.5 | 2 |
| Pass 3 | | |
| Product of Pass 2 | 217 | 0 |
| RM Sulfur [m] | 1.4 | 0 |
| TBBS [n] | 1.7 | 0 |
| DPG [o] | 2.0 | 0 |

[d] Solflex ® 1216 solution styrene-butadiene rubber (SBR) obtained commercially from The Goodyear Tire & Rubber Co.
[e] Budene 1207 butadiene rubber (BR) obtained commercially from The Goodyear Tire & Rubber Co.
[f] X50 ® S 1:1 by weight N330-HAF carbon black (Degussa Corp.) and bis (3-triethoxy silyl propyl)-1,4-tetrasulfide silane absorbed on the carbon black, obtained commercially from Struktol Corp. of America.
[g] Kadox ® surface treated zinc oxide, obtained commercially from Zinc Corporation of America.
[h] Wingstay ® 100 anitozonant, a mixture of diaryl p-phenylenediamines, obtained commercially from The Goodyear Tire & Rubber Co.
[i] Sundex ® 8125 aromatic hydrocarbon processing oil, obtained commercially from Sun Company, Inc., Refining and Marketing Division.
[j] Rubber grade stearic acid, obtained commercially from C. P. Hall.
[k] Santoflex ® 13 antiozonant, described as N-(1,3-dimethylbutyl)-N'-phenyl-p-phenylenediamine, obtained commercially from Flexsys.
[l] Sunolite ® 240 petroleum wax, obtained commercially from Witco-Organics.
[m] Rubber Makers (RM) sulfur, 100% active, obtained commercially from Taber, Inc.
[n] N-tert-butyl-2-benzothiazolesufenamide, obtained commercially from Monsanto.
[o] Diphenylguanidine, obtained commercially from Monsanto.

The ingredients of Pass 1 were added in the sequence shown to a Farrel Banbury internal mixer having an internal volume of 1175 milliliters and an initial internal temperature of 35° C. After operating for a total of 6 minutes, with an accompanying temperature rise of from 130° C. to 140° C., the contents of the internal mixer, i.e., the product of Pass 1, were removed and passed through a nip mill. The torque versus time plot for Example 1, shown in FIG. 1, was generated during the Pass 1 processing step. The product of Pass 1 was then reintroduced into the internal mixer along with the listed ingredients according to the sequence of Pass 2. During Pass 2, the internal mixer was operated for a total of 4 minutes with a final temperature of 150° C. to 160° C. The product of Pass 2 was passed through the nip mill, reintroduced into the internal mixer along with the listed ingredients of Pass 3 and processed for a total of 3.5 minutes at a temperature not exceeding 125° C. The rubber composition product of Pass 3, i.e., the rubber composition of Example 1, was processed through the nip mill, and physical properties of samples obtained therefrom are summarized in Table 2. Samples of the rubber composition of Example 1 were cured at a As temperature of 150° C. for a period of time (adjusted for mold heat lag) sufficient to provide 90 percent of maximum torque as measured by moving die rheometry.

EXAMPLE 2

A rubber composition was prepared using the amorphous precipitated silica of Example B and the following enumerated Ingredients.

| Ingredients | Parts by Weight | Time Added To Mixer (minutes) |
|---|---|---|
| Pass 1 | | |
| SBR Rubber [d] | 70.0 | 0 |
| BR Rubber [e] | 30.0 | 0 |
| Silica of Example B | 47.5 | 0.5 |
| Silica of Example B | 47.5 | 1.5 |
| Carbon black [f] | 13.0 | 2.5 |
| Zinc oxide [g] | 2.5 | 3.5 |
| Antiozonant [h] | 2.0 | 3.5 |
| Stearic acid [j] | 1.0 | 3.5 |
| Antiozonant [k] | 2.0 | 3.5 |
| Petroleum wax [l] | 1.5 | 3.5 |
| Pass 2 | | |
| Product of Pass 1 | 217 | 0 |
| RM Sulfur [m] | 1.4 | 0 |
| TBBS [n] | 1.7 | 0 |
| DPG [o] | 2.0 | 0 |

The ingredients of Pass 1 were added in the sequence shown to the same internal mixer used in Example 1, at an initial internal temperature of 35° C., and processed for a total of 6 minutes with an accompanying temperature increase of 130° C. to 140° C. The torque versus time plot for Example 2, shown in FIG. 1, was generated during the processing of Pass 1. The product of Pass 1 was passed through a nip mill, reintroduced into the internal mixer along with the listed ingredients of Pass 2 and processed for a total of 3.5 minutes at a temperature that did not exceed 125° C. The rubber composition product of Pass 2 was passed through the nip mill, and physical properties of samples obtained therefrom are summarized in Table 2. Samples of the rubber composition of Example 2 were cured at a temperature of 150° C. for a period of time (adjusted for mold/heat lag) sufficient to provide 90 percent of maximum torque as measured by moving die rheometry.

EXAMPLE 3

A rubber composition was prepared using the amorphous precipitated silica of Example C and the following enumerated ingredients.

| Ingredients | Parts by Weight | Time Added To Mixer (minutes) |
|---|---|---|
| Pass 1 | | |
| SBR Rubber [d] | 70.0 | 0 |
| BR Rubber [e] | 30.0 | 0 |
| Silica of Example C | 48 | 0.5 |
| Silica of Example C | 48 | 1.5 |
| Carbon black [f] | 13.0 | 2.5 |
| Zinc oxide [g] | 2.5 | 3.5 |
| Antiozonant [h] | 2.0 | 3.5 |
| Antiozonant [k] | 2.0 | 3.5 |
| Petroleum wax [l] | 1.5 | 3.5 |
| Pass 2 | | |
| Product of Pass 1 | 217 | 0 |
| RM Sulfur [m] | 1.4 | 0 |
| TBBS [n] | 1.7 | 0 |
| DPG [o] | 2.0 | 0 |

The ingredients of Pass 1 were added in the sequence shown to the same internal mixer used in Examples 1 and 2 at an initial internal temperature of 35° C., and processed for a total of 6 minutes with an accompanying temperature increase of 130° C. to 140° C. The torque versus time plot for Example 3, shown in FIG. 1, was generated during the processing of Pass 1. The product of Pass 1 was passed through a nip mill, reintroduced into the internal mixer along with the listed ingredients of Pass 2 and processed for a total of 3.5 minutes at a temperature not exceeding 125° C. The rubber composition of Example 3 was passed through the nip mill, and physical properties of samples obtained therefrom are summarized in Table 2. Samples of the rubber composition of Example 3 were cured at a temperature of 150° C. for a period of time (adjusted for mold/heat lag) sufficient to provide 90 percent of And maximum torque as measured by moving die rheometry.

TABLE 1

Rubber Composition Corresponding to Each of Examples 1–3

| Ingredients | Parts by Weight |
|---|---|
| SBR Rubber [d] | 31.5 |
| BR Rubber [e] | 13.5 |
| Cracked Hi-Sil ® EZ amorphous precipitated silica (as described in Example A) | 29.3 |
| Carbon black [f] | 5.9 |
| Zinc oxide [g] | 1.1 |
| Antiozonant [h] | 0.9 |
| Processing oil [i] | 13.5 |
| Stearic acid [j] | 0.4 |
| Antiozonant [k] | 0.9 |
| Petroleum Wax [l] | 0.7 |
| RM Sulfur [m] | 0.6 |
| TBBS [n] | 0.8 |
| DPG [o] | 0.9 |
| TOTAL | 100.0 |

TABLE 2

Rubber Composition Physical Properties

| | Example | | |
|---|---|---|---|
| Test | 1 | 2 | 3 |
| First Peak Time [p] (seconds) | 60 | 20 | 24 |
| Second Peak Time [q] (seconds) | 240 | 115 | 115 |
| % White Area [r] | 2.1 | 2.4 | 0.78 |
| Stress/Strain Data [s] | | | |
| 300% modulus (MPa) | 7.7 | 7.95 | 8 |
| Tensile Stress (MPa) | 19.3 | 19.2 | 20.87 |
| Elongation Stress | 539 | 536 | 574 |
| % Rebound [t] at 23° C. | 54.6 | 49.6 | 49.2 |
| % Rebound [t] at 100° C. | 66 | 63.2 | 63 |
| % Hardness [t] at 23° C. | 60 | 62 | 59 |
| % Hardness [t] at 100° C. | 58 | 58 | 56 |
| Moving Die Rheometer at 150° C. [u] | | | |
| Minimum viscosity (dNm) | 3.00 | 3.73 | 3.69 |
| Maximum viscosity (dNm) | 20.9 | 22.6 | 21.66 |
| Ts2 [v] (minutes) | 5.70 | 4.97 | 5.20 |
| T50 [w] (minutes) | 9.1 | 8.37 | 8.39 |
| T90 [x] (minutes) | 19.1 | 25.78 | 23.07 |

TABLE 2-continued

Rubber Composition Physical Properties

| | Example | | |
|---|---|---|---|
| Test | 1 | 2 | 3 |
| Goodrich Flexometer [y] | | | |
| % Permanent Set | 18 | 19 | 21 |
| Heat Build-Up (° C.) | 18 | 19 | 21 |
| Pico Abrasion Index [z] | 102 | 97 | 102 |

[p] First peak times were obtained from the plots of torque versus time shown in FIG. 1. The first peak time is indicative of the time it takes for the silica to be incorporated into the rubber. Lower first peak times are desirable.
[q] Second peak times were obtained from the plots of torque versus time shown in FIG. 1. The second peak time is indicative of the point in time during processing past which additional mixing will improve the dispersion of silica particles with in the rubber matrix. Lower second peak times are desirable.
[r] Percent white area was measured in accordance with the method described previously herein. Lower values of percent white area are desirable as they are indicative of improved silica dispersion within the rubber matrix.
[s] Stress/strain data was measured in accordance with ASTM D 412-87. Tensile stress and 300% modulus are given in units of MegaPascals (MPa).
[t] % Rebound at 23° C. and 100° C. and % Hardness at 23° C. and 100° C. were measured in accordance with International Organization for Standardization (ISO) test number 4662-1986 using a Zwick resiliometer.
[u] Moving die rheometry data was measured at 150° C. in accordance with ASTM D 2084-95. Minimum and maximum viscosity are given in units of deciNeuton meters (dNm).
[v] Time to a two unit rise above minimum torque.
[w] Time to 50 percent of maximum torque, i.e., time to 50 percent cure.
[x] Time to 90 percent of maximum torque, i.e., time to 90 percent cure.
[y] Measured in accordance with ASTM D 623-93.
[z] Measured in accordance with ASTM D 2228.

The results summarized in Table 2 show that a particulate composition according to the present invention, i.e., Example C, has improved dispersibility when used as a reinforcing filler in an elastomer, relative to the comparative particulate compositions of Examples A and B. The improved dispersibility is evidenced quantitatively by the lower percent white area value.

The first and second peak times data show that a particulate composition according to the present invention, i.e., Example C, has incorporation and dispersive times substantially equivalent to or less than those of the comparative particulate compositions of Examples A and B.

The results of Table 2 also show that a rubber vulcanizate reinforced with a particulate composition according to the present invention, i.e., Example 3, having physical properties substantially similar to those of Example 1, can be obtained in two rather than three passes through an internal mixer operated under similar conditions.

The present invention has been described with reference to specific details of particular embodiments thereof. It is not intended that such details be regarded as limitations upon the scope of the invention except insofar as and to the extent that they are included in the accompanying claims.

We claim:

1. A free flowing particulate composition comprising in combination:
   (a) particulate amorphous precipitated silica;
   (b) hydrocarbon process oil; and
   (c) organic carboxylic acid having from 2 to 30 carbon atoms, said hydrocarbon process oil and said organic carboxylic acid being sorbed on said silica and being present in amounts such that an elastomer reinforced with said free flowing particulate composition has a percent white area of less than 2 percent.

2. The particulate composition of claim 1 wherein at least 50 percent by weight of said particulate amorphous precipitated silica is in a size range of from 0.15 mm to 2.8 mm.

3. The particulate composition of claim 2 wherein said particulate amorphous precipitated silica is in the form of granules.

4. The particulate composition of claim 1 wherein said hydrocarbon process oil is selected from the group consisting of aromatic process oils, naphthenic process oils, paraffinic process oils and mixtures thereof.

5. The particulate composition of claim 1 wherein said organic carboxylic acid is selected from the group consisting of propionic acid, lauric acid, oleic acid, stearic acid and mixtures thereof.

6. A free flowing particulate composition comprising in combination:
   (a) particulate amorphous precipitated silica, at least 50 percent by weight of which is in a size range of from 0.15 mm to 2.8 mm;
   (b) hydrocarbon process oil selected from the group consisting of aromatic process oils, naphthenic process oils, paraffinic process oils and mixtures thereof; and
   (c) organic carboxylic acid having from 2 to 30 carbon atoms, said hydrocarbon process oil and said organic carboxylic acid being sorbed on said silica and being present in amounts such that an elastomer reinforced with said free flowing particulate composition has a percent white area of less than 2 percent.

7. The particulate composition of claim 6 wherein at least 65 percent by weight of said particulate amorphous precipitated silica is in a size range of from 0.85 mm to 2.8 mm, less than 0.6 percent by weight of said particulate amorphous precipitated silica is less than 0.075 mm, said particulate amorphous precipitated silica has a friability of 1.7 percent, said hydrocarbon process oil is present in an amount of from 10 percent to 70 percent by weight, based on the total weight of said particulate amorphous precipitated silica, and said organic carboxylic acid is selected from the group consisting of propionic acid, lauric acid, oleic acid, stearic acid and mixtures thereof.

8. The particulate composition of claim 7 wherein said particulate amorphous precipitated silica is in the form of granules, said hydrocarbon process oil is an aromatic process oil, and said organic carboxylic acid is present in an amount of from 0.5 percent to 10 percent by weight, based on the total weight of said particulate amorphous precipitated silica.

9. The particulate composition of claim 8 wherein said hydrocarbon process oil is present in an amount of from 30 percent to 60 percent by weight, based on the total weight of said particulate amorphous precipitated silica, and said organic carboxylic acid is stearic acid and is present in an amount of from 0.75 percent to 3 percent by weight, based on the total weight of said particulate amorphous precipitated silica.

10. The particulate composition of claim 1 wherein said particulate composition further comprises, in combination, a coupling amount of an organosilane coupling agent.

11. The particulate composition of claim 10 wherein said organosilane coupling agent is present in an amount of from 3 percent to 15 percent, based on the total weight of said particulate amorphous precipitated silica.

12. The particulate composition of claim 11 wherein said organosilane coupling agent is selected from the group consisting of (beta-mercaptoethyl)trimethoxysilane, bis(3-triethoxy silyl propyl)tetrasulfide silane and mixtures thereof.

13. A method of improving the dispersibility of particulate precipitated amorphous silica in an elastomer comprising dispersing into said elastomer a free flowing particulate composition comprising in combination:
   (a) particulate amorphous precipitated silica;
   (b) hydrocarbon process oil; and
   (c) organic carboxylic acid having from 2 to 30 carbon atoms, said hydrocarbon process oil and said organic carboxylic acid being sorbed on said silica and being present in amounts such that said elastomer reinforced with said free flowing particulate composition has a percent white area of less than 2 percent.

14. The method of claim 13 wherein at least 65 percent by weight of said particulate amorphous precipitated silica is in a size range of from 0.85 mm to 2.8 mm, less than 0.6 percent by weight of said particulate amorphous precipitated silica is less than 0.075 mm, and said particulate amorphous precipitated silica has a friability of less than 1.7 percent.

15. The method of claim 14 wherein said particulate amorphous precipitated silica is in the form of granules.

16. The method of claim 13 wherein said hydrocarbon process oil is selected from the group consisting of aromatic process oils, naphthenic process oils, paraffinic process oil and mixtures thereof.

17. The method of claim 16 wherein said hydrocarbon process oil is present in an amount of from 10 percent to 70 percent by weight, based on the total weight of said particulate amorphous precipitated silica.

18. The method of claim 17 wherein said hydrocarbon process oil is an aromatic process oil.

19. The method of claim 13 wherein said organic carboxylic acid is present in an amount of from 0.5 percent to 10 percent by weight, based on the total weight of said particulate amorphous precipitated silica, said organic carboxylic acid being selected from the group consisting of propionic acid, lauric acid, oleic acid, stearic acid and mixtures thereof.

20. The method of claim 19 wherein said organic carboxylic acid is stearic acid.

21. The method of claim 13 wherein said particulate composition further comprises, in combination, a coupling amount of an organosilane coupling agent.

22. The method of claim 21 wherein said organosilane coupling agent is selected from the group consisting of (beta-mercaptoethyl)trimethoxysilane, bis(3-triethoxy silyl propyl)tetrasulfide silane and mixtures thereof.

23. The method of claim 13 wherein said elastomer is selected from the group consisting of natural rubber, styrene-butadiene rubber, polybutadiene, ethylene-propylene rubber, polychloroprene, vinyl acetate-ethylene copolymers and mixtures thereof.

24. The method of claim 23 wherein said particulate composition is dispersed into said elastomer with an internal mixer.

* * * * *